United States Patent
Ambrose et al.

(10) Patent No.: US 6,784,258 B2
(45) Date of Patent: Aug. 31, 2004

(54) MODIFIED AMINOPLAST CROSSLINKERS AND POWDER COATING COMPOSITIONS CONTAINING SUCH CROSSLINKERS

(75) Inventors: Ronald R. Ambrose, Pittsburgh, PA (US); Anthony M. Chasser, Allison Park, PA (US); Shengkui Hu, Baden, PA (US); Jackie L. Smith, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 442 days.

(21) Appl. No.: 09/918,983

(22) Filed: Jul. 31, 2001

(65) Prior Publication Data

US 2002/0040112 A1 Apr. 4, 2002

Related U.S. Application Data

(63) Continuation-in-part of application No. 09/666,265, filed on Sep. 21, 2000, now Pat. No. 6,441,103.

(51) Int. Cl.$^7$ .......................... C08L 75/00; C08L 75/06; C08G 18/38
(52) U.S. Cl. ...................... 525/424; 525/427; 525/934; 524/904
(58) Field of Search ................................. 525/424, 427, 525/934; 524/904

(56) References Cited

U.S. PATENT DOCUMENTS

| | | | |
|---|---|---|---|
| 4,066,591 A | * | 1/1978 | Scriven et al. ............... 524/840 |
| 4,151,220 A | | 4/1979 | Watanabe et al. ........... 260/850 |
| 5,089,617 A | | 2/1992 | Forgione et al. ............. 544/196 |
| 5,302,462 A | | 4/1994 | Shah et al. .................. 428/482 |
| 5,814,410 A | | 9/1998 | Singer et al. ............. 428/423.1 |

FOREIGN PATENT DOCUMENTS

| | | |
|---|---|---|
| EP | 0 389 388 A1 | 9/1990 |
| EP | 0 915 113 A1 | 10/1998 |
| WO | WO94/15984 | 7/1994 |
| WO | WO 98/44060 | 10/1998 |

OTHER PUBLICATIONS

U.S. application Ser. No. 09/538,836 entitled Powder Coating Compositions Containing Carbamate Functional Polymers and filed Mar. 30, 2000.

* cited by examiner

Primary Examiner—Tae H. Yoon
(74) Attorney, Agent, or Firm—Diane R. Meyers; Deborah M. Altman

(57) ABSTRACT

A crosslinking agent is provided, prepared by reacting (A) an aminoplast resin; (B) a reactive urethane group-containing adduct and (C) at least one other compound having active hydrogen groups reactive with aminoplast resin (A). Compound (C) is selected from:

(i) compounds having the structure (I):

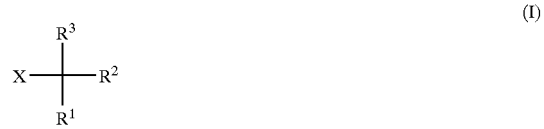

wherein X is aromatic; $R^1$, $R^2$, and $R^3$ each independently represents H, (cyclo)alkyl having from 1 to 12 carbon atoms, aryl, alkaryl, aralkyl, or an active hydrogen-containing group, (ii) compounds having the structure (II) or (III):

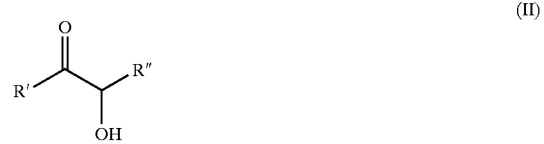

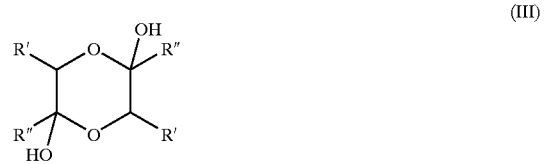

where R' and R" each independently represents an aromatic group or an alkyl group having 1 to 12 carbon atoms; and (iii) compounds different from (i) and (ii), having a melting point of at least 80° C.

Further provided are methods for preparing the crosslinking agent curable compositions containing the crosslinking agent, and coated substrates.

89 Claims, No Drawings

MODIFIED AMINOPLAST CROSSLINKERS AND POWDER COATING COMPOSITIONS CONTAINING SUCH CROSSLINKERS

CROSS-REFERENCE TO RELATED APPLICATIONS

This application is a continuation-in-part of U.S. patent application Ser. No. 09/666,265, filed Sep. 21, 2000, now U.S. Pat. No. 6,441,103, and incorporated herein by reference. Also, references are made to related applications Ser. Nos. 09/919,092; 09/919,094; 09/919,299; 09/918,788, and 09/918,848 filed concurrently herewith.

FIELD OF THE INVENTION

The present invention relates to crosslinking agents based on modified aminoplast resins and to powder coating compositions containing such crosslinking agents.

BACKGROUND OF THE INVENTION

In recent years, powder coatings have become increasingly popular because these coatings are inherently low in volatile organic content ("VOC"), which significantly reduces emissions of volatile organic compounds into the atmosphere during application and curing processes.

Hydroxyl, carboxyl, carbamate, and/or epoxy functional resins, such as acrylic and polyester resins having relatively high glass transition temperatures ("$T_g$"), are commonly used as main film-forming polymers for these coatings. Because acrylic polymer systems can be more heat-resistant than those containing condensation polymers, they can provide powder coating compositions having improved storage stability. However when exposed to the extreme temperatures which can be encountered in many geographic areas during shipping and/or storage, even better powder coating stability may be desired. By "storage stability" is meant the ability of the individual powder particles which comprise the powder coating to resist the tendency to adhere to one another, thereby causing "clumping" or "fusing" of the powder coating composition upon storage prior to application. Powder coating compositions having very poor storage stability can be difficult, if not impossible, to apply.

Aminoplast resins are well known in the art as low-cost crosslinking agents for hydroxyl, carboxyl and/or carbamate functional polymers in conventional liquid coating compositions. Common aminoplast resins are based on condensation products of formaldehyde with an amino- or amido- group carrying substance. Examples of these aminoplast resins include the methylol and alkoxymethyl derivatives of ureas, melamines, and benzoguanamines which are most commonly used in liquid coating compositions. Such aminoplast resins can provide enhanced coating properties such as exterior durability, chemical resistance, and mar resistance.

Attempts to produce powder coating compositions based on conventional aminoplast resins which exhibit these desirable properties have been largely unsatisfactory because these materials which are typically in liquid form, can cause poor powder stability.

The methoxylated aldehyde condensates of glycoluril, which are solid products, are the aminoplast resins most commonly employed as crosslinking agents in powder coating compositions. Although solid in form, these materials nonetheless can depress the $T_g$ of the powder coating composition significantly, even when combined with high $T_g$ film-forming polymers such as the acrylic polymers described above. Such a depression in $T_g$ also can result in poor powder stability.

Moreover, the use of conventional aminoplast resins in powder coating compositions can result in the phenomenon commonly referred to as "gassing". Gassing can occur as a result of vaporization of the alcohol generated in the thermally induced aminoplast crosslinking reaction. The alcohol vapor is driven off through the coating film upon heating and, as the viscosity of the coating increases during the curing process, pinholes or craters can be formed as the gas escapes through coating surface.

Carbamate functional polymers, that is, polymers having reactive pendent and/or terminal carbamate functional groups, are well known in the art as suitable film-forming resins for liquid coating systems where, for example, when combined with an aminotriazine curing agent, they provide coatings having excellent acid etch resistance. The carbamate NH groups react readily with the methoxyl groups of the aminotriazine curing agent, thereby forming urethane linkages which is believed to provide this acid etch resistance. These carbamate functional polymers can further provide coatings which have excellent durability and adhesion properties.

Copending U.S. patent application Ser. No. 09/538,836 discloses powder coating compositions comprising a solid particulate mixture of a carbamate functional polymer, for example, an acrylic, polyester, and/or polyurethane polymer, in conjunction with a glycoluril resin. Due to the high glass transition temperature of the carbamate functional polymer, the powder coating compositions can provide improved storage stability as well as coatings having excellent acid etch resistance. However, as discussed above, in some powder coating systems, the glycoluril crosslinking agent can depress the $T_g$ of the coating composition sufficiently to adversely effect powder stability.

It would, therefore, be advantageous to provide an aminotriazine-based crosslinking agent suitable for use in a powder coating composition which gives a highly stable powder as well as an acid etch resistant coating free of pinholes or crater resulting from "gassing" during the curing process.

SUMMARY OF THE INVENTION

In accordance with the present invention, an aminoplast-based crosslinking agent is provided, comprising an ungelled reaction product of the following reactants:

(A) at least one aminoplast resin;
(B) a reactive urethane group-containing adduct; and
(C) at least one compound different from (B) having active hydrogen groups reactive with aminoplast resin (A). The compound (C) is selected from at least one of:
  (i) compounds having the following structure (I):

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (A);

(ii) compounds having the following structure (II or III):

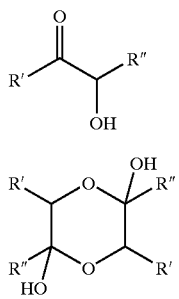

where R' and R" are the same or different and each independently represents an aromatic group or an alkyl group having 1 to 12 carbon atoms; and (iii) compounds different from both (i) and (ii) and having a melting point of at least 80° C.

The reactive urethane group-containing adduct (B) comprises a reaction product of (1) at least one polyisocyanate and (2) at least one monohydric capping agent. The crosslinking agent is essentially free of urethane NH functionality and has a glass transition temperature of at least 10° C.

The present invention also provides a method for preparing the crosslinking agent. The method comprises the steps of (1) reacting (a) at least one polyisocyanate, and (b) at least one monohydric capping agent, wherein the ratio of NCO equivalents of reactant (1) to OH equivalents of reactant (2) ranges from 0.8 to 1.0:1, to form the reactive urethane group-containing adduct (B); (2) combining the reactants (A), (B), and (C) described above in a ratio of total combined moles of (B) and (C) to moles of aminoplast resin (A) ranging from 1:1.5 to 3.2 to form a reaction admixture; and (3) heating the reaction admixture of step (2) to a temperature ranging from 95° C. to 135° C. for a time sufficient to form a powder crosslinking agent having a glass transition temperature of at least 10° C., which is essentially free of urethane NH functionality as determined by infrared spectroscopy.

Further provided is a curable composition comprising a film-forming polymer having reactive functional groups and the crosslinking agent described immediately above. Also provided is a curable powder coating composition comprising a solid particulate mixture of a reactive group-containing polymer having a $T_g$ of at least 30° C. and the crosslinking agent described immediately above.

The present invention additionally provides multilayer composite coating compositions comprising a base coat deposited from a base coat film-forming composition and a top coat over at least a portion of the base coat, the top coat deposited from a powder top coating composition comprising a solid particulate film-forming mixture of (A) a polymer containing reactive functional groups, said polymer having a glass transition temperature of at least 30° C. and (B) crosslinking agent described above.

Coated substrates are also provided.

DETAILED DESCRIPTION OF THE INVENTION

Other than in the operating examples, or where otherwise indicated, all numbers expressing quantities of ingredients, reaction conditions, and so forth, used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The reactive urethane group-containing reaction products useful in the preparation of the crosslinking agent of the present invention contain urethane groups of the following structure (IV):

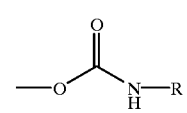

wherein R is a residue of a polyisocyanate. Each urethane NH group can react with a methoxyl group of the aminoplast resin and the resulting reaction product is an ungelled, solid material.

By contrast, for example, when a carbamate functionality (V) is used in place of a urethane structure (IV) to react under similar conditions with an aminoplast compound, the resulting reaction product typically is a gelled material. A carbamate functional group can be represented by the following structure (V):

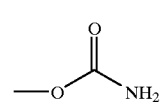

The above-mentioned gelation is presumably due to reaction of both hydrogen atoms of the one carbamate $NH_2$ group with aminoplast methoxyl groups.

As used herein, by "ungelled" is meant that the reaction product can be dissolved in a suitable solvent or resin and has an intrinsic viscosity when so dissolved. The intrinsic viscosity of the reaction product is an indication of its molecular weight. A gelled reaction product, on the other hand, since it is of essentially infinitely high molecular weight, will have an intrinsic viscosity too high to measure. Moreover, the reaction product can be melted, solidified, and remelted.

The aminoplast compounds (A) useful in the preparation of the crosslinking agent of the present invention include, for example, (alkoxyalkyl) aminotriazine compounds derived from melamine, glycoluril, benzoguanamine, acetoguanamine, formoguanamine, spiroguanamine, and the like.

Aminoplast resins are based on the condensation products of formaldehyde, with an amino- or amido-group carrying substance. Condensation products obtained from the reaction of alcohols and formaldehyde with melamine, urea, or benzoguanamine are most common and preferred herein. However, condensation products of other amines and amides can also be employed, for example, aldehyde condensates of triazines, diazines, triazoles, guanadines, guanamines, and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris (ethylamino)-1,3,5 triazine.

While the aldehyde employed is most often formaldehyde, other similar condensation products can be made from other aldehydes, such as acetaldehyde, crotonaldehyde, acrolein, benzaldehyde, furfural, and glyoxal.

The aminoplast resins can contain methylol or other alkylol groups and, in most instances, at least a portion of these alkylol groups are etherified by a reaction with an alcohol. Any monohydric alcohol can be employed for this purpose, including such alcohols as methanol, ethanol, propanol, butanol, pentanol, hexanol, heptanol, and others, as well as benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol.

In one embodiment of the present invention, the aminoplast resins comprise highly alkylated, low imino aminoplast resins which have a degree of polymerization ("DP") of less than 2.0, often less than 1.8, and typically less than 1.5. Generally, the number average degree of polymerization is defined as the average number of structural units per polymer chain (see George Odian, *Principles of Polymerization*, John Wiley & Sons (1991)). For purposes of the present invention, a DP of 1.0 would indicate a complete monomeric triazine structure, while a DP of 2.0 indicates two triazine rings joined by a methylene or methylene-oxy bridge. It should be understood that the DP values reported herein and in the claims represent average DP values as determined by gel permeation chromatography.

In a particular embodiment of the present invention, the aminoplast compound comprises an (alkoxyalkyl) aminotriazine having one or less non-alkylated NH bond per triazine ring. One example of such an aminoplast compound is (methoxymethyl) aminotriazine. Other suitable aminoplast compounds include alkoxylated aldehyde condensates of glycoluril and tetramethoxy methylglycoluril. Still other suitable aminoplast compounds specifically include modified melamine-formaldehyde resin, for example RESIMENE® CE-7103 commercially available from Solutia, Inc. and CYMEL® 300; ethylated-methylated benzoguanamine-formaldehyde resin, for example CYMEL® 1123; and methylated-butylated melamine-formaldehyde resin, for example CYMEL® 1135, all of which are commercially available from Cytec Industries, Inc.

The reactive urethane group-containing adduct (B) used to prepare the crosslinking agent of the present invention comprises the reaction product of (1) at least one polyisocyanate and (2) at least one monohydric capping agent. Non-limiting examples of polyisocyanates suitable for use as reactant (1) include aliphatic polyisocyanates, particularly aliphatic diisocyanates, for example, 1,4-tetramethylene diisocyanate and 1,6-hexamethylene diisocyanate; cycloaliphatic polyisocyanates, for example, 1,4-cyclohexyl diisocyanate, isophorone diisocyanate, and α,α-xylylene diisocyanate; and aromatic polyisocyanates, for example, 4,4'-diphenylmethane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Higher polyisocyanates, for example, isophorone diisocyanate trimer and hexamethylene diisocyanate trimer, are also useful. Mixtures of polyisocyanates can also be used.

The monohydric capping agent (2) can comprise any of a wide variety of mono-hydroxyl functional materials. Typically, the monohydric capping agent (2) comprises lower aliphatic alcohols, for example, cyclic and acyclic alcohols, having 1 to 6 carbon atoms in the alkyl group and/or aromatic alcohols. Non-limiting examples include methanol, ethanol, propanol, butanol, hexanol, cyclohexanol, and phenol. The monohydric capping agent include methanol, cyclohexanol, phenol, and mixtures thereof. In one embodiment of the present invention, the monohydric capping agent (2) comprises cyclohexanol.

The reactive urethane group-containing adduct (B) can be prepared by general NCO—OH reaction techniques well-known in the art, so long as the ratio of reactants (1) and (2) and reaction conditions are such that the resulting reaction product comprises at least one, typically at least two, reactive urethane NH groups per molecule. For purposes of the present invention, the ratio of NCO equivalents of the polyisocyanate (1) to OH equivalents of the monohydric capping agent (2) can range from 0.70 to 1.0:1, usually from 0.75 to 1.0:1, and typically from 0.8 to 1.0:1.

The reactive urethane group containing adduct (B) is generally prepared as follows. Typically, the polyisocyanate is dissolved in an appropriate aromatic solvent such as xylene and toluene, together with a tin compound, such as dibutyl tin dilaurate, as a catalyst. The mixture is preheated to a temperature of approximately 55° C. at which time the monohydric capping agent is added dropwise. The addition rate is adjusted to maintain a reaction temperature of less than 90° C. The reaction is complete when all the isocyanate functionality is consumed.

As aforementioned, in addition to the aminoplast resin (A) and the reactive urethane group-containing adduct (B) described immediately above, the reactants used to form the crosslinking agent of the present invention further comprise as component (C) at least one compound different from (B) having active hydrogen groups reactive with aminoplast resin (A). As previously discussed, compound (C) is selected from at least one of (i) compounds having the following structure (I):

wherein X is aromatic; $R^1$, $R^2$, and $R^3$ can be the same or different and each independently represents H, (cyclo)

alkyl having from 1 to 12 carbon atoms, aryl, alkaryl, aralkyl, or an active hydrogen-containing group which is reactive with the aminoplast resin (A), provided that at least one of $R^1$, $R^2$, and $R^3$ represents an active hydrogen-containing group which is reactive with the aminoplast resin (A); (ii) compounds having the following structure (II or III):

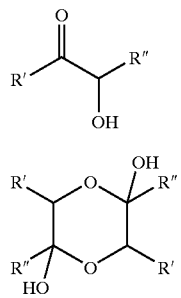

where R' and R" are the same or different and each independently represents an aromatic group or an alkyl group having 1 to 12 carbon atoms; and (iii) compounds different from both (i) and (ii) and having a melting point of at least 80° C. Mixtures of compounds (i), (ii), and (iii) can be used. As used herein, by "(cyclo)alkyl" is meant both alkyl and cycloalkyl groups.

In one embodiment of the present invention, compound (C) comprises at least one of compound (i) having the previously described structure (I). As aforementioned, the substituent group X represents an aromatic, for example, phenyl, and substituted phenyl groups, or a cycloaliphatic group, for example, cyclohexyl. These groups can be any fused or bridged ring structures such as naphthyl, anthracyl, and benzofuranyl. Also, the aromatic groups can be unsubstituted or substituted with heteroatoms, for example O, N, and S. Non-limiting examples of aromatic groups suitable as the substituent include phenyl, naphthyl, anthracyl, pyrene, benzofuranyl, and the like.

As previously mentioned, at least one of $R^1$, $R^2$, and $R^3$ represents a group comprising an active hydrogen-containing group reactive with the aminoplast resin (A) such as a group selected from hydroxyl, amide, amine, carboxylic acid, carbamate, urea, thiol, and combinations thereof. In one embodiment of the present invention, compound (C) comprises at least one compound having the structure (I) above wherein at least one of $R^1$, $R^2$, and $R^3$ represents a group comprising at least one hydroxyl group. Non-limiting examples of active hydrogen-containing compounds suitable for use as the reactant (c)(i) include benzyl alcohol and substituted benzyl alcohols such as 3-phenoxybenzyl alcohol and 4-methoxybenzyl alcohol, phenethyl alcohol, benzopinacol, N-benzylformamide, benzyl lactate, benzyl mandelate, benzyl mercaptan, N-benzylmethamine, 3-furanmethanol, furfuryl alcohol, pyridylcarbinols, for example, 2-pyridylcarbinol, and 3-pyridylcarbinol, 1-pyrenemethanol, 9-anthrancenemethanol, 9-fluorenemethanol, 9-hydroxyfluorene, 9-hydroxyxanthene, 9-phenylxanthen-9-ol, 4-stilbenemethanol and triphenylmethanol.

In another embodiment of the present invention, the active hydrogen containing compound (C) (ii) comprises compounds having the following structure (II):

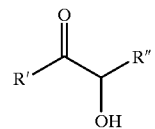

or dimer derivatives thereof as discussed below, where R' and R" are the same or different and each independently represents an aromatic group or an alkyl group having 1 to 12 carbon atoms. In one embodiment of the present invention, one or both of the substituent groups R' and R" are aromatic groups, for example phenyl, naphthyl, methoxy phenyl, and dimethylaminophenyl groups.

Also, suitable aromatic groups can contain one or more heteroatoms, such as O, N, and S, either internal or external to the aromatic ring. The heteroatoms external to the ring may be attached directly to the ring or indirectly through one or more carbon atoms. One or more heteroatoms may be present in each such substituent and one or more substituents may be attached to the aromatic ring. The heteroatom containing substituent group(s) may be attached to the aromatic ring in any position or combination of positions on the ring. Suitable heteroatomic substituent groups include but are not limited to amines, ethers, esters, ketones, amides, halides, sulfonamides, nitro and carboxylic acid groups. Heteroatoms internal to the aromatic ring may be present in any position or combination of positions. For example, such heteroaromatic groups can include but are not limited to furans, pyridines, thiophenes, triazines, imidazoles, oxazoles, thiazoles, pyrazoles, and triazoles. Non-limiting examples of such compounds include anisoin, pyridoin, furoin, bufyroin.

In one particular embodiment of the present invention, the active hydrogen-containing compound (c)(ii) comprises an active hydrogen-containing compound selected from benzoin, hydroxycyclohexyl phenylketone, and mixtures thereof.

Compounds having the general structure (II) above are known to form dimeric derivatives, particularly when R' and R" are alkyl (Merck Index, 11ed, p 10, 55).

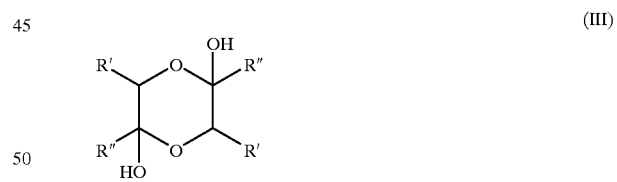

Such dimer derivatives can have the structure (III) above where R' and R" are as described above for the structure (II).

In yet another embodiment of the present invention, the active hydrogen-containing compound (C) comprises at least one of compound (iii), which is different from both (i) and (ii), and has a melting point of at least 80° C. The melting point of a compound can be determined by using a standard capillary melting point apparatus or by thermal analysis (ASTM E974-95).

Generally, the melting point of the active hydrogen-containing compound (C)(iii) is less than 250° C., usually less than 220° C., and typically less than 200° C. Also, the melting point of the active hydrogen containing compound (C)(iii) generally is at least 80° C., usually at least 90° C., and typically at least 100° C. The melting point of the active hydrogen containing compound (C)(iii) can range between any combination of these values inclusive of the recited values. Nonlimiting examples of compounds suitable for use as reactant (C)(iii) include mono-alcohols such as borneol, norborneol, isoborneol, 1-adamantanemethanol, 1-adamantanol, 2-methyl-2-adamantanol and 5-norbornen-2-ol; secondary amides, such as aliphatic cyclic amides such as 1-methylhydantoin, 2,4-thiazolidinedione, 2-azacyclotridecanone, 3,4,5,6,7,8-hexahydro-2(1H)-quinoline, 4-azatricyclo(4.3.1.1(3,8))undecan-5-one and 4-methoxy-3-pyrrolin-2-one; aliphatic open chain amides, such as N-(1-adamantyl)acetamide) and N-tert-butylacrylamide; aromatic (poly)cyclic amides, including lactams, such as 1-acetamidopyrene, 2-acetamide-3-nitro-9-fluorenone, 2-acetoamide-7-fluorfluorene, 2-acetamidofluorene, 4-acetamido-9-fluorenone, naphthol AS acetate, 1-phenyl-3-pyrazolidinone, 2,3-dimethyl-1-(4-methylphenyl)-3-pyrazolin-5-one, 3,4-dimethyl-1-phenyl-3-pyrazolin-5-one, 3-(4-ethoxyphenyl)-1-(2-nitrophenyl)-hydantoin, 4-acetamidoantipyrine, and 4-acetamidobenzaldehyde; aromatic open chain amides, such as 3-acetamidocoumarin and p-acetophenetidide; and mono-urethanes such as those obtained by reacting high melting point mono-alcohols (such as those described immediately above) with suitable mono-isocyanates.

The active hydrogen-containing compound (C) can comprise one or more of compounds, (C)(i), (C)(ii), and (C)(iii). Inclusion of the active hydrogen-containing compound (C) as a reactant in the preparation of the crosslinking agent of the present invention can provide several advantages. First, reaction of the active hydrogen-containing compound (C) with the aminoplast resin (A) can generally increase the $T_g$ of the resultant crosslinker as compared to an analogous crosslinking agent having no such modification. Also, compounds such as (C)(i), (C)(ii), and (C)(iii) described above can allow for the reaction of more alkoxy groups of the aminoplast resin (A) without resulting in a gelled reaction product. Such a crosslinking agent when incorporated into curable powder coating compositions can affect less gassing upon curing. Furthermore, when crosslinking agents of the present invention are used in curable powder coating compositions, the degassing agent may be released in situ. This can reduce adverse effects, for example, yellowing of the film, which can be caused by the presence of the degassing agent during curing processes.

In the preparation of the crosslinking agent of the present invention, the reactive urethane group-containing adduct (B) is prepared in a first step as described above. The aminoplast resin (A), the reactive urethane group-containing adduct (B), and active hydrogen-containing compound (C) are combined in a ratio of total combined moles of (B) and (C) to moles of aminoplast resin (A) ranging from 1:1.5 to 3.2 to form a reaction admixture.

The aminoplast resin (A) generally constitutes 90 weight percent or less, often 85 weight percent or less, and typically 80 weight percent or less of the reaction mixture, based on the total combined weight of reactants (A), (B), and (C). Also, the aminoplast resin (A) generally constitutes at least 55 weight percent, often at least 60 weight percent, and typically at least 65 weight percent of the reaction mixture, based on the total combined weight of reactants (A), (B), and (C). The percent by weight of the aminoplast resin (A) present in the reaction mixture can range between any combination of these values inclusive of the recited values.

The polyfunctional polymer (B) generally constitutes 45 weight percent or less, often 40 weight percent or less, and typically 35 weight percent or less of the reaction mixture, based on the total combined weight of reactants (A), (B), and (C). Also, the polyfunctional polymer (B) generally constitutes at least 10 weight percent, often at least 15 weight percent, and typically at least 20 weight percent of the reaction mixture, based on the total combined weight of the reactants (A), (B), and (C). The percent by weight of the polyfunctional polymer (B) present in the reaction mixture can range between any combination of these values inclusive of the recited values.

The active hydrogen-containing compound (C) generally constitutes 45 weight percent or less, often 40 weight percent or less, and typically 35 weight percent or less of the reaction mixture, based on the total combined weight of reactants (A), (B), and (C). Also, the active hydrogen group-containing compound (C) generally constitutes at least 10 weight percent, often at least 15 weight percent, and typically at least 20 weight percent of the reaction mixture, based on the total combined weight of reactants (A), (B) and (C). The percent by weight of the active hydrogen-containing compound (C) present in the reaction mixture can range between any combination of these values inclusive of the recited values.

With regard to the aminoplast resin (A), it should be understood that the theoretical monomeric molecular weight of the aminoplast resin (that is, DP=1) is used to calculate the above-referenced "molar ratio". The reactants are typically combined in a suitable aromatic solvent, for example, xylene and toluene, together with an appropriate strong acid catalyst. Non-limiting examples of suitable strong acid catalysts include dodecyl benzene sulfonic acid and para-toluene sulfonic acid. Then, the reaction admixture formed in the second step is heated to a temperature ranging from 90° C. to 135° C., preferably 100° C. to 120° C., for a time sufficient to form a solid crosslinking agent having a glass transition temperature of at least 25° C. This results in a stable crosslinking agent that is essentially free of urethane NH functionality. The reaction is monitored typically via infrared spectroscopy for the disappearance of urethane NH functionality relative to an internal standard (e.g., the signal of a structure that will remain unchanged during the reaction, for example, the urethane carbonyl signal). The reaction may be terminated when the end point is detected by infrared spectroscopy or other suitable analytical technique.

The crosslinking agent of the present invention can have a glass transition temperature of at least 10° C., often at least 15° C., usually preferably at least 20° C., and typically at least 25° C. Also, the crosslinking agent can have a glass transition temperature less than 150° C., often less than 120° C., usually less than 100° C., and typically less than 80° C. The glass transition temperature of the crosslinking agent can range between any combination of these values, inclusive of the recited values.

The present invention also relates to a curable composition comprising (1) a polymer containing reactive functional groups and (2) the crosslinking agent. In a particular embodiment of the invention, the curable composition is a powder coating composition comprising a solid particulate film-forming mixture of (1) a polymer containing reactive functional groups and having a glass transition temperature of at least 30° C., and (2) the crosslinking agent described above.

Curable powder coatings are particulate compositions that are solid and free-flowing at ambient room temperature. The components (1) and (2) of the curable powder coating composition may each independently comprise one or more functional species, and are each present in amounts sufficient to provide cured coatings having a desirable combination of physical properties, e.g., smoothness, optical clarity, scratch resistance, solvent resistance, and hardness.

As used herein, the term "reactive" refers to a functional group that forms a covalent bond with another functional group under suitable reaction conditions.

As used herein, the term "cure", as used in connection with a composition, e.g., "a curable composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density values indicate a higher degree of crosslinking in the coating.

Also, as used herein, the term "polymer" is meant to refer to oligomers and both homopolymers and copolymers.

The polymer (1) can be of any variety of polymers having aminoplast-reactive functional groups as are well known in the art, so long as the $T_g$ of the polymer is sufficiently high to permit the formation of a stable, solid particulate composition. The $T_g$ of the polymer (1) can be at least 30° C., usually at least 40° C., typically at least 50° C. The $T_g$ of the polymer (1) also can be less than 130° C., usually less than 100° C., typically less than 80° C. The $T_g$ of the functional group-containing polymer (1) can range between any combination of these values inclusive of the recited values.

Non-limiting examples of polymers having reactive functional groups useful in the powder coating compositions of the invention as the polymer (1) include those selected from acrylic, polyester, polyepoxide, polyurethane and polyether polymers and combinations thereof. Acrylic and polyester polymers are typically employed.

The polymer (1) can comprise a wide variety of reactive functional groups, for example, hydroxyl, carboxyl, carbamate, epoxy, and/or amide functional groups. The polymer (1) can comprise reactive functional groups selected from hydroxyl, epoxy, carboxyl, and/or carbamate functional groups. In one embodiment, the polymer (1) comprises hydroxyl and/or carbamate functional groups. In another embodiment of the present invention, the polymer (1) comprises hydroxyl and/or epoxy functional groups.

Suitable functional group-containing acrylic polymers include copolymers prepared from one or more alkyl esters of acrylic acid or methacrylic acid and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate. Also, when epoxy functional polymers are desired, epoxy functional monomers, for example, glycidyl acrylate and glycidyl methacrylate and allyl glycidyl ether, are suitable. Ethylenically unsaturated carboxylic acid functional monomers, for example, acrylic acid and/or methacrylic acid, can also be used when a carboxylic acid functional acrylic polymer is desired. Amide functional acrylic polymers can be formed by polymerizing ethylenically unsaturated acrylamide monomers, such as N-butoxymethyl acrylamide and N-butoxyethyl acrylamide with other polymerizable ethylenically unsaturated monomers. Non-limiting examples of suitable other polymerizable ethylenically unsaturated monomers include vinyl aromatic compounds, such as styrene and vinyl toluene; nitriles, such as acrylonitrile and methacrylonitrile; vinyl and vinylidene halides, such as vinyl chloride and vinylidene fluoride; and vinyl esters, such as vinyl acetate.

In one embodiment of the present invention, the acrylic polymers contain hydroxyl functionality which can be incorporated into the acrylic polymer through the use of hydroxyl functional monomers, such as hydroxyethyl acrylate, hydroxypropyl acrylate, hydroxyethyl methacrylate, and hydroxypropyl methacrylate, which may be copolymerized with the other acrylic monomers mentioned above.

In another embodiment of the invention, the acrylic polymer can be prepared from ethylenically unsaturated, beta-hydroxy ester functional monomers. Such monomers are derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether, and the like. Suitable glycidyl esters include those which are commercially available from Shell Chemical Company under the tradename CARDURA® E; and from Exxon Chemical Company under the tradename GLYDEXX®-10.

Alternatively, the beta-hydroxy ester functional monomers can be prepared from an ethylenically unsaturated, epoxy functional monomer, for example, glycidyl methacrylate and allyl glycidyl ether, and a saturated carboxylic acid, such as a saturated monocarboxylic acid, for example, isostearic acid.

The hydroxyl group-containing acrylic polymers useful in the compositions of the present invention include those having a hydroxyl value ranging from 10 to 150, usually from 15 to 100, and typically from 20 to 50.

The acrylic polymer can be prepared by solution polymerization techniques in the presence of suitable initiators such as organic peroxides or azo compounds, for example, benzoyl peroxide or N,N-azobis(isobutyronitrile). The polymerization can be carried out in an organic solution in which the monomers are soluble by techniques conventional in the art.

Pendent and/or terminal carbamate functional groups can be incorporated into the acrylic polymer by copolymerizing the acrylic monomer with a carbamate functional vinyl monomer, such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers can include the reaction product of hydroxyethyl methacrylate, isophorone diisocyanate and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328.

Carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether.

The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic, and aromatic alcohols, such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Also, hydroxyl functional acrylic polymers can be reacted with isocyanic acid yielding pendent carbamate groups. Note that the production of isocyanic acid is disclosed in U.S. Pat. No. 4,364,913. Likewise, hydroxyl functional acrylic polymers can be reacted with urea to give an acrylic polymer with pendent carbamate groups.

Epoxide functional acrylic polymers can be prepared by polymerizing one or more epoxide functional ethylenically unsaturated monomers, e.g., glycidyl(meth)acrylate and allyl glycidyl ether, with one or more ethylenically unsaturated monomers that are free of epoxide functionality, e.g., methyl(meth)acrylate, isobornyl(meth)acrylate, butyl(meth)acrylate and styrene. Examples of epoxide functional ethylenically unsaturated monomers that may be used in the preparation of epoxide functional acrylic polymers include, but are not limited to, glycidyl(meth)acrylate, 3,4-epoxycyclohexylmethyl(meth)acrylate, 2-(3,4-epoxycyclohexyl)ethyl(meth)acrylate and allyl glycidyl ether. Examples of ethylenically unsaturated monomers that are free of epoxide functionality include those described above, as well as those described in U.S. Pat. No. 5,407,707 at column 2, lines 17 through 56, which disclosure is incorporated herein by reference. In one embodiment of the present invention, the epoxide functional acrylic polymer is prepared from a majority of (meth)acrylate monomers.

The functional group-containing acrylic polymer can have an Mn ranging from 500 to 30,000 and typically from 1000 to 5000. If carbamate functional, the acrylic polymer can have a calculated carbamate equivalent weight within the range of 15 to 150, and typically less than 50, based on equivalents of reactive carbamate groups.

Non-limiting examples of functional group-containing polyester polymers suitable for use as the polymer (1) in the powder coating compositions of the present invention can include linear or branched polyesters having hydroxyl, carboxyl, and/or carbamate functionality. Such polyester polymers are generally prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols. Transesterification of polycarboxylic acid esters using conventional techniques is also possible.

The polyols which usually are employed in making the polyester (or the polyurethane polymer, as described below) include alkylene glycols, such as ethylene glycol and other diols, such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol, and the like. Polyols of higher functionality may also be used. Examples include trimethylolpropane, trimethylolethane, pentaerythritol, tris-hydroxyethylisocyanurate, and the like. Branched polyols, such as trimethylolpropane, are preferred in the preparation of the polyester.

The acid component used to prepare the polyester polymer can include, primarily, monomeric carboxylic acids or anhydrides thereof having 2 to 18 carbon atoms per molecule. Among the acids which are useful are cycloaliphatic acids and anhydrides, such as phthalic acid, isophthalic acid, terephthalic acid, tetrahydrophthalic acid, hexahydrophthalic acid, methylhexahydrophthalic acid, 1,3-cyclohexane dicarboxylic acid, and 1,4-cyclohexane dicarboxylic acid. Other suitable acids include adipic acid, azelaic acid, sebacic acid, maleic acid, glutaric acid, decanoic diacid, dodecanoic diacid, and other dicarboxylic acids of various types The polyester may include minor amounts of monobasic acids such as benzoic acid, stearic acid, acetic acid and oleic acid. Also, there may be employed higher carboxylic acids, such as trimellitic acid and tricarballylic acid. Where acids are referred to above, it is understood that anhydrides thereof which exist may be used in place of the acid. Also, lower alkyl esters of diacids, such as dimethyl glutarate and dimethyl terephthalate, can be used. Because it is readily available and low in cost, terephthalic acid is preferred.

Pendent and/or terminal carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the acrylic polymers or by reacting isocyanic acid with a hydroxyl functional polyester.

The functional group-containing polyester polymer can have an Mn ranging from 500 to 30,000, often 1000 to 5000. If carbamate functional, the polyester polymer can have a calculated carbamate equivalent weight within the range of 15 to 150, typically 20 to 75, based on equivalents of reactive pendent or terminal carbamate groups.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has hydroxy functionality and the desired molecular weight.

Non-limiting examples of suitable polyurethane polymers having pendent and/or terminal hydroxyl and/or carbamate functional groups include the polymeric reaction products of polyols, which are prepared by reacting the polyester polyols or acrylic polyols, such as those mentioned above, with a polyisocyanate such that the OH/NCO equivalent ratio is greater than 1:1 such that free hydroxyl groups are present in the product. Such reactions employ typical conditions for urethane formation, for example, temperatures of 60° C. to 90° C. and up to ambient pressure, as known to those skilled in the art.

The organic polyisocyanates which can be used to prepare the functional group-containing polyurethane polymer include aliphatic or aromatic polyisocyanates or a mixture of the two. Diisocyanates often employed are preferred, although higher polyisocyanates can be used in place of or in combination with diisocyanates.

Examples of suitable aromatic diisocyanates include 4,4'-diphenylmethane diisocyanate and toluene diisocyanate. Examples of suitable aliphatic diisocyanates include straight chain aliphatic diisocyanates, such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates include 1,2,4-benzene triisocyanate and polymethylene polyphenyl isocyanate.

Terminal and/or pendent carbamate functional groups can be incorporated into the polyurethane by reacting a polyisocyanate with a polyester polyol containing the terminal/pendent carbamate groups. Alternatively, carbamate functional groups can be incorporated into the polyurethane by reacting a polyisocyanate with a polyester polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer.

The hydroxyl and/or carbamate functional group-containing polyurethane polymers typically have an Mn ranging from 500 to 20,000, preferably from 1000 to 5000. If carbamate functional, the polyurethane polymer typically has a carbamate equivalent weight within the range of 15 to 150, preferably 20 to 75, based on equivalents of reactive pendent or terminal carbamate groups.

Although generally not preferred, for some applications it may be desirable to employ a functional group-containing polyether polymer in the powder coating compositions of the present invention. Suitable hydroxyl and/or carbamate functional polyether polymers can be prepared by reacting a polyether polyol with urea under reaction conditions well known to those skilled in the art. More preferably, the polyether polymer is prepared by a transcarbamoylation reaction similar to the reaction described above in connection with the incorporation of carbamate groups into the acrylic polymers.

Examples of polyether polyols are polyalkylene ether polyols which include those having the following structural formulae (VI) and (VII):

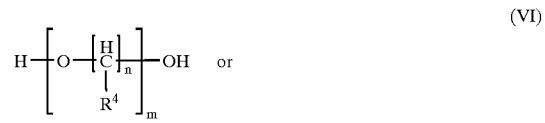

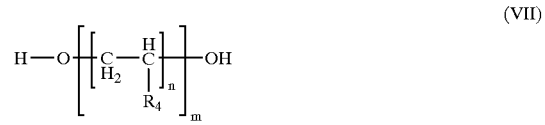

where the substituent $R^4$ is hydrogen or lower alkyl containing from 1 to 5 carbon atoms including mixed substituents, n is typically from 2 to 6, and m is from 8 to 100 or higher. Note that the hydroxyl groups, as shown in structures (VI) and (VII) above, are terminal to the molecules. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols, such as ethylene glycol, 1,6-hexanediol, Bisphenol A and the like, or other higher polyols, such as trimethylolpropane, pentaerythritol, and the like. Polyols of higher functionality which can be utilized as indicated can be made, for instance, by oxyalkylation of compounds, such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Suitable polyethers include those sold under the tradenames TERATHANE® and TERACOL®, available from E. I. DuPont de Nemours and Company, Inc.; and POLYMEG®, available from Q O Chemicals, Inc., a subsidiary of Great Lakes Chemical Corp.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Suitable functional group-containing polyether polymers can have an Mn ranging from 500 to 30,000 and typically from 1000 to 5000. If carbamate functional, the polyether polymers can have a carbamate equivalent weight within the range of 15 to 150, usually 25 to 75, based on equivalents of reactive pendent and/or terminal carbamate groups and the solids of the polyether polymer.

It should be understood that carbamate functional group-containing polymers can contain residual hydroxyl functional groups which provide additional crosslinking sites. The carbamate/hydroxyl functional group-containing polymer (1) can have a residual hydroxyl value ranging from 0.5 to 10, usually from 1 to 10, and typically from 2 to 10 (mg KOH per gram).

The functional group-containing polymer (1) can be present in the powder coating compositions of the present invention in an amount ranging from at least 5 percent by weight, often at least 20 percent by weight, usually at least 30 percent by weight, and typically at least 40 percent by weight based on the total weight of resin solids in the film-forming composition. The functional group-containing polymer (1) also can be present in the powder coating compositions of the present invention in an amount less than 95 percent by weight, often less than 90 percent by weight, usually less than 85 percent by weight, and typically less than 80 percent by weight based on the total weight of the powder coating composition. The amount of the functional group-containing polymer (1) present in the powder coating compositions of the present invention can range between any combination of these values inclusive of the recited values.

As mentioned above, the powder coating compositions of the present invention further comprise, as component (2), the crosslinking agent described in detail above. The crosslinking agent (2) can be present in the powder coating compositions of the present invention in an amount ranging from at least 5 percent by weight, often at least 10 percent by weight, usually at least 15 percent by weight, and typically at least 20 percent by weight based on the total weight of the powder coating composition. The crosslinking agent (2) also can be present in the powder coating compositions of the present invention in an amount less than 95 percent by weight, often less than 80 percent by weight, usually less than 70 percent by weight, and typically less than 60 percent by weight based on the total weight of the powder coating composition. The amount of the crosslinking agent (2) present in the powder coating compositions of the present invention can range between any combination of these values inclusive of the recited values.

If desired, the powder coating compositions of the present invention also can include one or more adjuvant curing agents different from the crosslinking agent (2). The adjuvant curing agent can be any compound having functional groups reactive with the functional groups of the polymer (1) and/or the crosslinking agent (2) described above. Non-limiting examples of suitable adjuvant curing agents include blocked isocyanates, triazine compounds, glycoluril resins, and mixtures thereof.

The blocked isocyanates suitable for use as the adjuvant curing agent in the powder coating compositions of the invention are known compounds and can be obtained from commercial sources or may be prepared according to published procedures. Upon being heated to cure the powder coating compositions, the isocyanates are unblocked and the isocyanate groups become available to react with the functional groups of the polymer (1).

Any suitable aliphatic, cycloaliphatic, or aromatic alkyl monoalcohol known to those skilled in the art can be used as a blocking agent for the isocyanate. Other suitable blocking agents include oximes and lactams. Non-limiting examples of suitable blocked isocyanate curing agents include those based on isophorone diisocyanate blocked with epsilon-caprolactam; toluene 2,4-toluene diisocyanate blocked with epsilon-caprolactam; or phenol-blocked hexamethylene diisocyanate. The blocked isocyanates mentioned immediately above are described in detail in U.S. Pat. No. 4,988,793 at column 3, lines 1 to 36. Preferred blocked isocyanate curing agents include BF-1530, which is the reaction product of epsilon-caprolactam blocked T1890, a trimerized isophorone diisocyanate ("IPDI") with an isocyanate equivalent weight of 280, and BF-1540, a uretidione of IPDI with an isocyanate equivalent weight of 280, all of which are available from Creanova of Somerset N.J.

Conventional aminoplast crosslinkers can be used as the adjuvant curing agent provided that the $T_g$ of the coating is not lowered to an undesirable extent. Non-limiting examples of such conventional aminoplast resins include aldehyde condensates of glycoluril, such as those described above. Glycoluril resins suitable for use as the adjuvant curing agent in the powder coating compositions of the invention include POWDERLINK® 1174 commercially available from Cytec Industries, Inc. of Stamford, Conn.

When employed, the adjuvant curing agent can be present in the powder coating compositions of the present invention in an amount ranging from 5 to 0.5 percent by weight, often from 5 to 1 percent by weight, usually from 5 to 2 percent by weight, and typically from 4 to 2 percent by weight based on the total weight of the powder coating composition.

Also suitable for use as an adjuvant curing agent in the powder coating compositions of the present invention are triazine compounds, such as the tricarbamoyl triazine compounds described in detail in U.S. Pat. No. 5,084,541. When used, the triazine curing agent is typically present in the powder coating composition of the present invention in an amount ranging up to about 20 percent by weight, and preferably from about 1 to 20 percent by weight, percent by weight based on the total weight of the powder coating composition. Mixtures of the above-described curing agents also can be used advantageously.

Also, it should be understood that for purposes of the present invention, the curable powder coating compositions, which contain epoxy group-containing polymers, typically also include an epoxide-reactive curing (i.e., crosslinking) agent, most often an acid functional curing agent, in addition to the crosslinking agent (2). A secondary hydroxyl group can be generated upon reaction of each epoxy functional group with a functional group of the epoxide-reactive curing agent. These secondary hydroxyl groups are then available for subsequent reaction with the aminoplast-based crosslinking agent of the present invention. Epoxide-reactive curing agents which can be used in curable powder coating compositions comprising an epoxide functional polymer may have functional groups selected from hydroxyl, thiol, primary amines, secondary amines, acid (e.g. carboxylic acid), and mixtures thereof. Useful epoxide reactive curing agents having amine functionality include, for example, dicyandiamide and substituted dicyandiamides. Most often, the epoxide reactive curing agent has carboxylic acid groups.

In one embodiment of the present invention, the epoxide reactive crosslinking agent has carboxylic acid functionality and is substantially crystalline. By "crystalline" is meant that the co-reactant contains at least some crystalline domains, and correspondingly may contain some amorphous domains. While not necessary, the epoxide reactive crosslinking agent can have a melt viscosity less than that of the epoxy functional polymer (at the same temperature). As used herein and in the claims, by "epoxide reactive crosslinking agent" is meant that the epoxide reactive crosslinking agent has at least one, typically two functional groups that are reactive with epoxide functionality.

In a particular embodiment, the epoxide reactive crosslinking agent is a carboxylic acid functional curing agent which contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebasic acid, maleic acid, citric acid, itaconic acid, aconitic acid, and mixtures thereof.

Other suitable carboxylic acid functional curing agents include those represented by the following general formula (VIII),

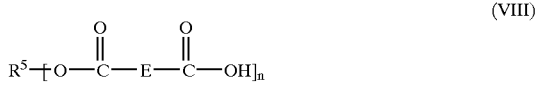

(VIII)

In general formula (VIII), $R^5$ is the residue of a polyol, E is a divalent linking group having from 1 to 10 carbon atoms, and n is an integer of from 2 to 10. Examples of polyols from which $R^5$ of general formula (VIII) may be derived include, but are not limited to, ethylene glycol, di(ethylene glycol), trimethylolethane, trimethylolpropane, pentaerythritol, di-trimethylolpropane, di-pentaerythritol, and mixtures thereof. Divalent linking groups from which E may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid-1,2-phenylene. The divalent linking group E is preferably aliphatic.

The curing agent represented by general formula (VIII) is typically prepared from a polyol and a dibasic acid or cyclic anhydride. For example, trimethylol propane and hexahydro-4-methylphthalic anhydride are reacted together in a molar ratio of 1:3 respectively, to form a carboxylic acid functional curing agent. This particular curing agent can be described with reference to general formula (VIII) as follows, $R^5$ is the residue of trimethylol propane, E is the divalent linking group 4-methyl-1,2-cyclohexylene, and n is 3. Carboxylic acid functional curing agents described herein with reference to general formula VIII also are meant to include any unreacted starting materials and/or co-products, e.g., oligomeric species, resulting from their preparation and contained therein.

Curable powder coating compositions comprising an epoxide functional polymer and an epoxide reactive curing agent can also include one or more cure catalysts for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. When employed, the curing catalyst is typically present in the curable powder coating composition in an amount of less than 5 percent by weight, e.g., from 0.25 percent by weight to 2.0 percent by weight, based on total weight of the composition.

Curable powder coating compositions comprising epoxide functional polymers and epoxide reactive curing agents typically contain both in a total amount ranging from 50 percent to 99 percent by weight, based on the total weight of the composition, e.g., from 70 percent to 85 percent by weight, based on the total weight of the composition. The epoxide reactive curing agent is typically present in the curable powder coating composition in an amount corresponding to a portion of these recited ranges, i.e., 5 to 40, particularly 15 to 30, percent by weight, based on the total weight of the composition. The equivalent ratio of epoxide equivalents in the epoxide functional polymer to the equivalents of reactive functional groups in the curing agent is typically from 0.5:1 to 2:1, e.g., from 0.8:1 to 1.5:1.

Curable powder coating compositions of the present invention comprising an epoxide functional polymer as reactant (1) and an epoxide reactive curing agent typically contain the crosslinking agent (2) in an amount ranging from 1 to 50 weight percent, preferably from 2 to 40 weight percent, and more preferably from 15 to 30 weight percent, based on total weight of the powder coating composition.

The powder coating compositions of the present invention can further include additives as are commonly known in the art. Typical additives include benzoin, used to reduce entrapped air or volatiles; flow aids or flow control agents which aid in the formation of a smooth and/or glossy surface, for example, MODAFLOW® available from Monsanto Chemical Co., waxes such as MICROWAX® C available from Hoechst, fillers such as calcium carbonate, barium sulfate and the like; pigments and dyes as colorants; UV light stabilizers such as TINUVIN® 123 or TINUVIN® 900 available from CIBA Specialty Chemicals and catalysts to promote the various crosslinking reactions.

Such additives are typically present in the powder coating compositions of the present invention in an amount ranging from 1 to 20 weight percent based on total weight of the powder coating composition.

The powder coating compositions of the invention typically are prepared by blending the functional group-containing polymer (1) and the crosslinking agent (2) for approximately 1 minute in a Henschel blade blender. The mixture is then extruded through an extruder, for example, a Baker-Perkins twin screw extruder, at a temperature ranging from 158° F. to 266° F. (70° C. to 130° C.). The resultant chip is usually ground and classified to an appropriate particle size, typically between 20 and 200 microns, in a cyclone grinder/sifter.

The powder coating compositions of the invention can be applied to a variety of substrates including metallic substrates, for example, aluminum and steel substrates, and non-metallic substrates, for example, thermoplastic or thermoset composite substrates. The powder coating compositions are typically applied by spraying and, in the case of a metal substrate, by electrostatic spraying, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the powder coating composition, the powder coated substrate is heated to a temperature sufficient to cure the coating, usually to a temperature ranging from 250° F. to 500° F. (121.1° C. to 260.0° C.) for 1 to 60 minutes, and typically from 300° F. to 400° F. (148.9° C. to 204.4° C.) for 15 to 30 minutes.

The powder coating composition can be applied as a primer or primer surfacer, or as a top coat, for example, a "monocoat". In one embodiment, the present invention is directed to a powder coating composition which is advantageously employed as a top coat in a multi-layer composite coating composition. Such a multi-component composite coating composition generally comprises a base coat deposited from a base coat film-forming composition (typically pigmented) and a top coat applied over the base coat, the top coat being deposited from the powder coating composition of the present invention as described above. In one particular embodiment, the multi-component composite coating composition is a color-plus-clear system where the base coat is pigmented and the top coat is deposited from a powder coating composition which is substantially pigment-free, i.e., a clear coat.

The film-forming composition from which the base coat is deposited can be any of the compositions useful in coatings applications, for example, in automotive applications where color-plus-clear systems are most often used. A film-forming composition conventionally comprises a resinous binder and, typically, a pigment to serve as a colorant. Particularly useful resinous binders include acrylic polymers, polyester polymers including alkyds, and polyurethane polymers.

The resinous binders for the base coat can be organic solvent-based materials, such as those described in U.S. Pat. No. 4,220,679. Water-based coating compositions, such as those described in U.S. Pat. Nos. 4,403,003; 4,147,679; and 5,071,904, also can be used as the base coat composition.

As mentioned above, the base coat compositions also contain pigments of various types as colorants. Suitable metallic pigments include aluminum flake, bronze flake, copper flake, and the like. Other examples of suitable pigments include mica, iron oxides, lead oxides, carbon black, titanium dioxide, talc, as well as a variety of color pigments.

Optional ingredients for the base coat film-forming compositions include those which are well known in the art of surface coatings and include surfactants, flow control agents, thixotropic agents, fillers, anti-gassing agents, organic co-solvents, catalysts, and other suitable adjuvants.

The base coat film-forming compositions can be applied to the substrate by any of the conventional coating techniques, such as brushing, spraying, dipping, or flowing, but they are most often spray-applied. The usual spray techniques and equipment for air spraying, airless spraying, and electrostatic spraying can be used.

The base coat film-forming compositions typically are applied to the substrate such that a cured base coat having a film thickness ranging from 0.5 to 4 mils (12.5 to 100 micrometers) is formed thereon.

After forming a film of the base coat on the substrate, the base coat can be cured or alternatively given a drying step in which solvent, i.e., organic solvent and/or water, is driven off by heating or an air drying step before application of the clear coat. Suitable drying conditions will depend on the particular base coat film-forming composition and on the ambient humidity with certain water-based compositions. In general, a drying time ranging from 1 to 15 minutes at a temperature of 75° F. to 200° F. (21° C. to 93° C.) is adequate.

The curable powder top coating composition can be applied to the base coat by any of the methods of application described above. As discussed above, the powder top coat can be applied to a cured or a dried base coat before the base coat has been cured. In the latter case, the powder top coat and the base coat are cured simultaneously.

Illustrating the invention are the following examples which are not to be considered as limiting the invention to their details. Unless otherwise indicated, all parts and percentages in the following examples, as well as throughout the specification, are by weight.

EXAMPLES

Examples A–D describe the preparation of crosslinking agents in accordance with the present invention. The crosslinking agents were prepared by modifying an appropriate melamine-based aminoplast resin.

Example A

Into a two-liter four-necked reaction kettle equipped with a thermometer, a mechanical stirrer, nitrogen inlet, and means for removing the by-product (methanol) were placed 222.0 parts of isophorone diisocyanate trimer, 200.5 parts of xylene, and 0.8 part of di-butyl tin di-laurate. After the mixture was warmed up to 60° C., 110.0 parts of cyclohexanol and 331.0 parts of xylene were added dropwise through an addition funnel. The mixture was further heated up and held at 90° C. until it was free of NCO functionality. Thereafter, 800.0 parts of Cymel® 300, available from Cytec Industries, Inc., 106.0 parts of benzoin, and 2.0 parts of p-toluenesulfonic acid were added to the kettle. The mixture was heated to 120° C. and the temperature was maintained while the methanol by-product was removed from the system. The reaction progress was monitored by measuring the IR spectra of the mixture and was terminated when the end point was detected. The mixture was then concentrated at a temperature of 100–130° C. in a vacuum of 3–50 mm Hg to remove the xylene solvent. The product thus obtained was a pale yellow solid with a softening temperature of around 35° C.

Example B

Into a two-liter four-necked reaction kettle equipped with a thermometer, a mechanical stirrer, nitrogen inlet, and means for removing the by-product (methanol) were placed 222.0 parts of isophorone diisocyanate trimer, 200.5 parts of xylene, and 0.8 part of di-butyl tin di-laurate. After the mixture was warmed up to 60° C., 110.0 parts of cyclohexanol and 331.0 parts of xylene were added dropwise through an addition funnel. The mixture was further heated up and held at 90° C. until it was free of NCO functionality. Thereafter, 800.0 parts of Cymel® 300, 77.0 parts of isoborneol, and 2.0 parts of p-toluenesulfonic acid were added to the kettle. The mixture was heated to 120° C. and the temperature was maintained while the methanol by-product was removed from the system. The reaction progress was monitored by measuring the IR spectra of the mixture and was terminated when the end point was detected. The mixture was then concentrated at a temperature of 100–130° C. in a vacuum of 3–50 mm Hg to remove the xylene solvent. The product thus obtained was a pale yellow solid with a softening temperature of around 32° C.

Example C

Into a two-liter four-necked reaction kettle equipped with a thermometer, a mechanical stirrer, nitrogen inlet, and means for removing the by-product (methanol) were placed 222.0 parts of isophorone diisocyanate trimer, 200.5 parts of xylene, and 0.8 part of di-butyl tin di-laurate. After the mixture was warmed up to 60° C., 110.0 parts of cyclohexanol and 331.0 parts of xylene were added dropwise through an addition funnel. The mixture was further heated up and held at 90° C. until it was free of NCO functionality. Thereafter, 800.0 parts of Cymel® 300, 106.0 parts of benzoin, 77.0 parts of isoborneol, and 2.0 parts of p-toluenesulfonic acid were added to the kettle. The mixture was heated to 120° C. and the temperature was maintained while the methanol by-product was removed from the system. The reaction progress was monitored by measuring the IR spectra of the mixture and was terminated when the end point was detected. The mixture was then concentrated at a temperature of 100–130° C. in a vacuum of 3–50 mm Hg to remove the xylene solvent. The product thus obtained was a pale yellow solid with a softening temperature of around 41° C.

Example D

This example describes the preparation of a crosslinking agent in accordance with the present invention using benzoin and benzyl alcohol.

Into a two-liter four-necked reaction kettle equipped with a thermometer, a mechanical stirrer, nitrogen inlet, and means for removing the by-product (methanol) are placed 222.0 parts of isophorone diisocyanate trimer, 200.5 parts of xylene, and 0.8 part of di-butyl tin di-laurate. After the mixture is warmed up to 60° C., 110.0 parts of cyclohexanol and 331.0 parts of xylene are added dropwise through an addition funnel. The mixture is further heated up and held at 90° C. until it is free of NCO functionality. Thereafter, 800.0 parts of Cymel® 300, 106.0 parts of benzoin, 54.0 parts of benzyl alcohol, and 2.0 parts of p-toluenesulfonic acid are added to the kettle. The mixture is heated to 120° C. and the temperature is maintained while the methanol by-product is removed from the system. The reaction progress is monitored by measuring the IR spectra of the mixture and is terminated when the end point is detected. The mixture is then concentrated at a temperature of 100–130° C. in a vacuum of 3–50 mm Hg to remove the xylene solvent. The product thus obtained is a pale yellow solid.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A crosslinking agent comprising an ungelled reaction product of the following reactants:

(A) at least one aminoplast resin;

(B) a reactive urethane group-containing adduct which is a reaction product of the following reactants:
(1) at least one polyisocyanate, and
(2) at least one monohydric capping agent; and (C) at least one compound different from (B) having active hydrogen groups reactive with aminoplast resin (A), said compound selected from at least one of the group consisting of:
(i) compounds having the following structure (I):

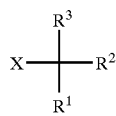

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (A);

(ii) compounds having the following structure (II) or (III):

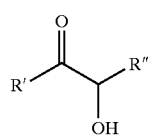

(II)

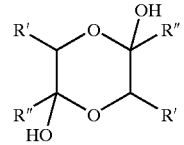

(III)

where R' and R'' are the same or different and each independently represents an aromatic group or an alkyl group having 1 to 12 carbon atoms; and (iii) compounds different from (i) and (ii) and having a melting point of at least 80° C.;

wherein said crosslinking agent is essentially free of urethane NH functionality and has a glass transition temperature of at least 10° C.

2. The crosslinking agent of claim 1, wherein the polyisocyanate (1) is selected from the group consisting of isocyanurate of isophorone diisocyanate trimer, isocyanurate of hexane diisocyanate trimer, and mixtures thereof.

3. The crosslinking agent of claim 2, wherein the polyisocyanate (1) comprises the isocyanurate of isophorone diisocyanate trimer.

4. The crosslinking agent of claim 1, wherein the monohydric capping agent (2) is selected from the group consisting of methanol, cyclohexanol, phenol, and mixtures thereof.

5. The crosslinking agent of claim 1, wherein the monohydric capping agent (2) comprises cyclohexanol.

6. The crosslinking agent of claim 1, wherein the ratio of NCO equivalents of the polyisocyanate (1) to OH equivalents of the monohydric capping agent (2) ranges from 0.8 to 1.0:1.

7. The crosslinking agent of claim 1, wherein the aminoplast resin (A) is or is derived from at least one of glycoluril, aminotriazine, and benzoguanamine.

8. The crosslinking agent of claim 7, wherein the aminoplast resin (A) comprises alkoxylated aldehyde condensate of glycoluril.

9. The crosslinking agent of claim 8, wherein the aminoplast resin (A) comprises tetramethoxy methylglycoluril.

10. The crosslinking agent of claim 7, wherein the aminoplast resin (A) comprises (alkoxyalkyl) aminotriazine having one or less non-alkylated NH bond per triazine ring.

11. The crosslinking agent of claim 10, wherein the aminoplast resin (A) comprises (methoxymethyl) aminotriazine.

12. The crosslinking agent of claim 10, wherein the (alkoxyalkyl) aminotriazine has a degree of polymerization of 1.75 or less.

13. The crosslinking agent of claim 1, wherein the ratio of total combined moles of (B) and (C) to moles of aminoplast resin (A) ranges from 1:1.5 to 3.2.

14. The crosslinking agent of claim 1, wherein the compound (C) comprises at least one compound having the structure (I).

15. The crosslinking agent of claim 14, wherein at least one of $R^1$, $R^2$, and $R^3$ represents a group comprising an active hydrogen-containing group selected from the group consisting of hydroxyl, amide, amine, carboxylic acid, carbamate, urea, thiol, and mixtures thereof.

16. The crosslinking agent of claim 15, wherein at least one of $R^1$, $R^2$, and $R^3$ represents a group comprising at least one hydroxyl group.

17. The crosslinking agent of claim 16, wherein the compound (C) comprises benzyl alcohol.

18. The crosslinking agent of claim 1, wherein the compound (C) comprises at least one of compound (C)(ii).

19. The crosslinking agent of claim 18, wherein the compound (C) comprises a hydroxyl functional group-containing compound having the following structure (II):

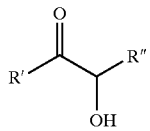
(II)

or dimer derivatives thereof, wherein R' and R" are the same or different and each independently represents an (cyclo) alkyl group having 1 to 12 carbon atoms or an aromatic group.

20. The crosslinking agent of claim 19, wherein one or both of R' and R" represent aromatic groups.

21. The crosslinking agent of claim 19, wherein the compound (C) comprises a compound selected from the group consisting of benzoin, hydroxycyclohexyl phenyl ketone, and mixtures thereof.

22. The crosslinking agent of claim 21, wherein the compound (C) comprises benzoin.

23. The crosslinking agent of claim 21, wherein the compound (C) comprises hydroxycyclohexyl phenyl ketone.

24. The crosslinking agent of claim 19, wherein one or both of R' and R' are aromatic groups containing at least one heteroatom selected from furyl, pyridyl, methoxy phenyl, and dimethylaminophenyl groups.

25. The crosslinking agent of claim 18, wherein the active hydrogen group-containing compound (C) comprises a compound having the following structure (III):

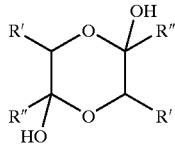
(III)

wherein R and R' are the same or different and each independently represents an alkyl group having 1 to 12 carbon atoms or an aromatic group.

26. The crosslinking agent of claim 1, wherein the compound (C) comprises at least one of compound (C)(iii).

27. The crosslinking agent of claim 1, wherein compound (C) comprises an aliphatic mono-functional alcohol selected from the group consisting of borneol, norborneol, isoborneol, 1-adamantanemethanol, 1-adamantanol, 2-methyl-2-adamantanol and 5-norbornen-2-ol.

28. The crosslinking agent of claim 1, wherein the compound (C) is selected from the group consisting of benzoin, isoborneol, triphenylmethanol, N-tert-butylacrylamide, p-acetophenetidide, and mixtures thereof.

29. A method for preparing a crosslinking agent of claim 1 comprising the following steps:
(1) reacting the following reactants:
   (a) at least one polyisocyanate, and
   (b) at least one monohydric capping agent,
   wherein the ratio of NCO equivalents of reactant (a) to OH equivalents of reactant (b) ranges from 0.8 to 1.0:1, to form a urethane group-containing reaction product;
(2) combining the following:
   (A) at least one aminoplast resin;
   (B) the urethane group-containing reaction product formed in step (1); and (C) at least one compound different from (B) having active hydrogen groups reactive with aminoplast resin (A), said compound selected from at least one of the group consisting of:
   (i) compounds having the following structure (I):

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group,
provided that at least one of $R^1$, $R^2$, and $R^3$ represents an active hydrogen-containing group which is reactive with the aminoplast resin (A);
   (ii) compounds having the following structure (II) or (III):

(II)

(III)

where R' and R" are the same or different and each independently represents an aromatic group or an alkyl group having 1 to 12 carbon atoms; and
   (iii) compounds different from (i) and (ii) and having a melting point of at least 80° C.; in a ratio of total combined moles of (B) and (C) to moles of aminoplast resin (A) ranging from 1:1.5 to 3.2 to form a reaction admixture; and
(3) heating the reaction admixture formed in step (2) to a temperature ranging from 95° C. to 135° C. for a time sufficient to form a crosslinking agent.

30. The method of claim 29, wherein the polyisocyanate (a) is selected from the group consisting of isocyanurate of isophorone diisocyanate trimer, isocyanurate of hexane diisocyanate trimer, and mixtures thereof.

31. The method of claim 30, wherein the polyisocyanate (a) comprises the isocyanurate of isophorone diisocyanate trimer.

32. The method of claim 29, wherein the monohydric capping agent (b) is selected from methanol, cyclohexanol, phenol, and mixtures thereof.

33. The method of claim 32, wherein the monohydric capping agent (b) comprises cyclohexanol.

34. The method of claim 29, wherein the aminoplast resin (A) is or is derived from at least one of glycoluril, aminotriazine, and benzoguanamine.

35. The method of claim 34, wherein the aminoplast resin (A) comprises alkoxylated aldehyde condensate of glycoluril.

36. The method of claim 35, wherein the aminoplast resin (A) comprises tetramethoxy methylglycoluril.

37. The method of claim 34, wherein the aminoplast resin (A) comprises (alkoxyalkyl) aminotriazine having one or less non-alkylated NH bond per triazine ring.

38. The method of claim 37, wherein the aminoplast resin (A) comprises (methoxymethyl) aminotriazine.

39. The method of claim 37, wherein the (alkoxyalkyl) aminotriazine has a degree of polymerization of 1.75 or less.

40. The method of claim 29, wherein the compound (C) comprises at least one compound having the structure (I).

41. The method of claim 40, wherein at least one of $R^1$, $R^2$, and $R^3$ represents a group comprising an active hydrogen-containing group selected from hydroxyl, amide, amine, carboxylic acid, carbamate, urea, thiol, and mixtures thereof.

42. The method of claim 41, wherein at least one of $R^1$, $R^2$, and $R^3$ represents a group comprising at least one hydroxyl group.

43. The method of claim 29, wherein compound (C) comprises benzyl alcohol.

44. The method of claim 29, wherein the compound (C) comprises at least one of compound (C)(ii).

45. The method of claim 44, wherein the compound (C) comprises a hydroxyl functional group-containing compound having the following structure (II):

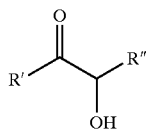

(II)

or dimer derivatives thereof, wherein R' and R" are the same or different and each independently represents a (cyclo)alkyl group having 1 to 12 carbon atoms or an aromatic group.

46. The method of claim 45, wherein one or both of R' and R" represent aromatic groups.

47. The method of claim 45 wherein compound (C) comprises a compound selected from the group consisting of benzoin, hydroxycyclohexyl phenyl ketone, and mixtures thereof.

48. The method of claim 47, wherein the compound (C) comprises benzoin.

49. The method of claim 47, wherein the compound (C) comprises hydroxycyclohexyl phenyl ketone.

50. The method of claim 45, wherein one or both of R' and R" are aromatic groups containing at least one heteroatom selected from furyl, pyridyl, methoxy phenyl, and dimethylaminophenyl groups.

51. The method of claim 44, wherein compound (C) comprises a compound having the following structure (III):

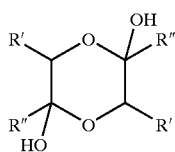

(III)

wherein R' and R" are the same or different and each independently represents an alkyl group having 1 to 12 carbon atoms or an aromatic group.

52. The method of claim 29, wherein the compound (C) comprises at least one of compound (C)(iii).

53. The method of claim 52, wherein compound (C) comprises an aliphatic mono-functional alcohol selected from the group consisting of borneol, norborneol, isoborneol, 1-adamantanemethanol, 1-adamantanol, 2-methyl-2-adamantanol, and 5-norbornen-2-ol.

54. The method of claim 29, wherein the compound (C) comprises a compound selected from the group consisting of benzoin, isoborneol, triphenylmethanol, N-tert-butylacrylamide, p-acetophenetidide, and mixtures thereof.

55. A curable composition comprising the following components:
(A) a film-forming polymer having reactive functional groups; and
(B) a crosslinking agent having functional groups reactive with the functional groups of (A),
said crosslinking agent comprising an ungelled reaction product of the following:
(1) at least one aminoplast resin;
(2) a reactive urethane group-containing adduct which is a reaction product of the following reactants:
(a) at least one polyisocyanate, and
(b) at least one monohydric capping agent; and
(3) at least one compound different from (2) having active hydrogen groups reactive with aminoplast resin (1), said compound selected from at least one of the group consisting of:
(i) compounds having the following structure (I):

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group,
provided that at least one of $R^1$, $R^2$, and $R^3$ represents an active hydrogen-containing group which is reactive with the aminoplast resin (A);
(ii) compounds having the following structure (II) or (III):

(II)

(III)

where R' and R" are the same or different and each independently represents an aromatic group or an alkyl group having 1 to 12 carbon atoms; and
(iii) compounds different from (i) and (ii) and having a melting point of at least 80° C.;
wherein said crosslinking agent is essentially free of urethane NH functionality.

56. The curable composition of claim 55, wherein the polymer (A) is selected from the group consisting of acrylic, polyester, polyepoxide polyurethane and polyether polymers, and mixtures thereof.

57. The curable composition of claim 55, wherein the polymer (A) comprises reactive functional groups selected from the group consisting of hydroxyl, carbamate, epoxy, carboxylic acid, and mixtures thereof.

58. The curable composition of claim 57, wherein the polymer (A) comprises hydroxyl and/or carbamate functional groups.

59. The curable composition of claim 57, wherein the polymer (A) comprises hydroxyl and/or epoxy functional groups.

60. The curable composition of claim 55, wherein the polymer (A) is present in an amount ranging from 90 to 5 weight percent based on weight of total resin solids present in the composition.

61. The curable composition of claim 55, wherein the polyisocyanate (a) is selected from the group consisting of isocyanurate of isophorone diisocyanate trimer, isocyanurate of hexane diisocyanate trimer, and mixtures thereof.

62. The curable composition of claim 61, wherein the polyisocyanate (a) comprises an isocyanurate of isophorone diisocyanate trimer.

63. The curable composition of claim 55, wherein the monohydric capping agent (b) is selected from the group consisting of methanol, cyclohexanol, phenol, and mixtures thereof.

64. The curable composition of claim 63, wherein the monohydric capping agent (b) comprises cyclohexanol.

65. The curable composition of claim 55, wherein the ratio of NCO equivalents of the polyisocyanate (a) to OH equivalents of the monohydric capping agent (b) ranges from 0.8 to 1.0:1.

66. The curable coating composition of claim 55, wherein the aminoplast resin (A) is or is derived from at least one of glycoluril, aminotriazine, and benzoguanamine.

67. The curable coating composition of claim 66, wherein the aminoplast resin (A) comprises an alkoxylated aldehyde condensate of glycoluril.

68. The curable powder composition of claim 67, wherein the aminoplast resin (A) comprises tetramethoxy methylglycoluril.

69. The curable powder coating composition of claim 66, wherein the aminoplast resin (A) comprises (alkoxyalkyl) aminotriazine having one or less non-alkylated NH bond per triazine ring.

70. The curable powder coating composition of claim 69, wherein the aminoplast resin (A) comprises (methoxymethyl) aminotriazine.

71. The curable powder coating composition of claim 69, wherein the (alkoxyalkyl) aminotriazine has a degree of polymerization of 1.75 or less.

72. The curable composition of claim 55, wherein the ratio of total combined moles of (2) and (3) to moles of aminoplast resin (1) ranges from 1:1.5 to 3.2.

73. The curable composition of claim 55, wherein the compound (C) comprises at least one compound having the structure (I).

74. The curable composition of claim 73, wherein at least one of $R^1$, $R^2$, and $R^3$ represents a group comprising an active hydrogen-containing group selected from the group consisting of hydroxyl, amide, amine, carboxylic acid, carbamate, urea, thiol, and mixtures thereof.

75. The curable composition of claim 73, wherein at least one of $R^1$, $R^2$, and $R^3$ represents a group comprising at least one hydroxyl group.

76. The curable composition of claim 73, wherein compound (C) comprises benzyl alcohol.

77. The curable composition of claim 55, wherein the compound (C) comprises at least one of compound (C)(ii).

78. The curable composition of claim 77, wherein the compound (C) comprises a hydroxyl functional group-containing compound having the following structure (II):

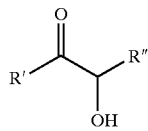

(II)

or dimer derivatives thereof, wherein R' and R" are the same or different and each independently represents an (cyclo) alkyl group having 1 to 12 carbon atoms or an aromatic group.

79. The curable composition of claim 78, wherein one or both of R' and R" represent aromatic groups.

80. The curable composition of claim 78, wherein compound (C) comprises a compound selected from the group consisting of benzoin, hydroxycyclohexyl phenyl ketone, and mixtures thereof.

81. The curable composition of claim 80, wherein the compound (C) comprises benzoin.

82. The curable composition of claim 80, wherein the compound (C) comprises hydroxycyclohexyl phenyl ketone.

83. The curable composition of claim 78, wherein one or both of R and R' are aromatic groups containing at least one heteroatom selected from the group consisting of furyl, pyridyl, methoxy phenyl, and dimethylaminophenyl groups.

84. The curable composition of claim 77, wherein compound (C) comprises a compound having the following structure (III):

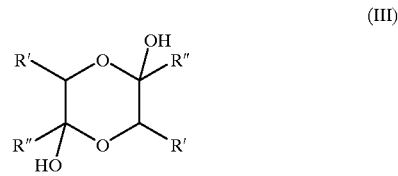

(III)

wherein R' and R" are the same or different and each independently represents an alkyl group having 1 to 12 carbon atoms or an aromatic group.

85. The curable composition of claim 55, wherein the compound (C) comprises a compound selected from the group consisting of aliphatic monofunctional alcohols, aryl aliphatic mono-functional alcohols, secondary amides, aliphatic open-chain amides, aromatic (poly)cyclic amides, aromatic open-chain amide, and monofunctional urethanes.

86. The curable composition of claim 85, wherein compound (C) comprises an aliphatic mono-functional alcohol selected from the group consisting of borneol, norborneol, isoborneol, 1-adamantanemethanol, 1-adamantanol, 2-methyl-2-adamantanol, and 5-norbornen-2-ol.

87. The curable composition of claim 55, wherein the compound (C) comprises a compound selected from the group consisting of benzoin, isoborneol, triphenylmethanol, N-tert-butylacrylamide, p-acetophenetidide, and mixtures thereof.

88. The curable composition of claim 55, wherein the crosslinking agent (B) is present in an amount ranging from 5 to 95 weight percent based on weight of total resin solids present in the composition.

89. The curable composition of claim 55, wherein said composition is a curable powder coating composition.

* * * * *